US007249069B2

(12) United States Patent
Alie et al.

(10) Patent No.: US 7,249,069 B2
(45) Date of Patent: Jul. 24, 2007

(54) INTERNATIONAL CASH-ON-DELIVERY SYSTEM AND METHOD

(75) Inventors: Jason D. Alie, Roswell, GA (US); Paul E. Vliek, Dunwoody, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 19 days.

(21) Appl. No.: 09/939,782

(22) Filed: Aug. 27, 2001

(65) Prior Publication Data
US 2003/0040947 A1 Feb. 27, 2003

(51) Int. Cl.
G06Q 10/00 (2006.01)
(52) U.S. Cl. .............................. 705/28; 705/26; 705/27
(58) Field of Classification Search .................... 705/7, 705/26–28
See application file for complete search history.

(56) References Cited

U.S. PATENT DOCUMENTS

| | | | |
|---|---|---|---|
| 4,799,156 A | 1/1989 | Shavit et al. | |
| 5,311,424 A | 5/1994 | Mukherjee et al. | |
| 5,440,634 A | 8/1995 | Jones et al. | |
| 5,557,518 A | 9/1996 | Rosen | |
| 5,666,493 A | 9/1997 | Wojcik et al. | |
| 5,671,280 A | 9/1997 | Rosen | |
| 5,694,551 A | 12/1997 | Doyle et al. | |
| 5,712,789 A | 1/1998 | Radican | |
| 5,717,989 A * | 2/1998 | Tozzoli et al. | ................. 705/37 |
| 5,721,832 A | 2/1998 | Westrope et al. | |
| 5,724,424 A | 3/1998 | Gifford | |
| 5,732,400 A | 3/1998 | Mandler et al. | |
| 5,770,841 A | 6/1998 | Moed et al. | |
| 5,787,402 A | 7/1998 | Potter et al. | |
| 5,794,207 A | 8/1998 | Walker et al. | |
| 5,802,497 A | 9/1998 | Manasse | |

(Continued)

FOREIGN PATENT DOCUMENTS

WO    WO-96/08783    3/1996

(Continued)

OTHER PUBLICATIONS

BWire1: "Corporate Profile for TradeCard, Inc." Business Wire, May 26, 2000, Proquest #54220155.*

(Continued)

*Primary Examiner*—Robert M. Pond
(74) *Attorney, Agent, or Firm*—Alston & Bird LLP

(57) ABSTRACT

An international cash-on-delivery (I-COD) system for completing a transaction between a seller in a first country and purchaser in a second country, wherein the seller has agreed to exchange packaged goods for a payment from the purchaser. The international delivery system includes a delivery service system, a payment system and an information system. The delivery system physically handles delivery of the packaged goods, including import and export clearing, and holding of the packaged goods in escrow at an intermediate location until payment by the purchaser. The payment system handles the flow of funds including receiving payment from the purchaser, holding the payment in escrow and distribution of the payment to the seller upon delivery of the packaged goods. The information system electronically coordinates escrow aspects of both the delivery service system, and the payment system, so as to minimize the risk of the transaction to both the seller and the purchaser.

38 Claims, 5 Drawing Sheets

U.S. PATENT DOCUMENTS

| | | | |
|---|---|---|---|
| 5,878,139 | A | 3/1999 | Rosen |
| 5,890,137 | A | 3/1999 | Koreeda |
| 5,897,621 | A | 4/1999 | Boesch et al. |
| 5,909,492 | A | 6/1999 | Payne et al. |
| 5,910,896 | A | 6/1999 | Hahn-Carlson |
| 5,949,876 | A | 9/1999 | Ginter et al. |
| 5,950,178 | A | 9/1999 | Borgato |
| 5,960,408 | A | 9/1999 | Martin et al. |
| 5,963,923 | A | 10/1999 | Garber |
| 5,968,110 | A | 10/1999 | Westrope et al. |
| 5,974,146 | A | 10/1999 | Randle et al. |
| 6,029,150 | A | 2/2000 | Kravitz |
| 6,041,315 | A | 3/2000 | Pollin |
| 6,049,785 | A | 4/2000 | Gifford |
| 6,064,994 | A | 5/2000 | Kubatzki et al. |
| 6,067,532 | A | 5/2000 | Gebb |
| 6,076,078 | A | 6/2000 | Camp et al. |
| 6,081,790 | A | 6/2000 | Rosen |
| 6,088,797 | A | 7/2000 | Rosen |
| 6,108,639 | A * | 8/2000 | Walker et al. ............... 705/26 |
| 6,141,653 | A | 10/2000 | Conklin et al. |
| 6,151,588 | A | 11/2000 | Tozzoli et al. |
| 6,161,121 | A | 12/2000 | Hardy et al. |
| 6,167,385 | A | 12/2000 | Hartley-Urquahart |
| 6,175,921 | B1 | 1/2001 | Rosen |
| 6,178,409 | B1 | 1/2001 | Weber et al. |
| 6,185,683 | B1 | 2/2001 | Ginter et al. |
| 6,186,893 | B1 | 2/2001 | Walker et al. |
| 6,199,051 | B1 | 3/2001 | Gifford |
| 6,205,433 | B1 | 3/2001 | Boesch et al. |
| 6,205,436 | B1 | 3/2001 | Rosen |
| 6,205,437 | B1 | 3/2001 | Gifford |
| 6,240,396 | B1 | 5/2001 | Walker et al. |
| 6,289,323 | B1 | 9/2001 | Gordon et al. |
| 6,460,020 | B1 | 10/2002 | Pool et al. |
| 6,539,360 | B1 | 3/2003 | Kadaba |
| 6,748,366 | B1 | 6/2004 | Hurwitz et al. |
| 6,865,559 | B2 * | 3/2005 | Dutta ......................... 705/75 |
| 6,934,692 | B1 * | 8/2005 | Duncan ....................... 705/14 |
| 2001/0018672 | A1 | 8/2001 | Petters et al. |
| 2002/0010665 | A1 | 1/2002 | Lefebvre et al. |
| 2002/0065738 | A1 | 5/2002 | Riggs et al. |
| 2002/0077915 | A1 | 6/2002 | Goto et al. |
| 2002/0091574 | A1 | 7/2002 | Lefebvre et al. |
| 2002/0095355 | A1 | 7/2002 | Walker et al. |
| 2002/0120561 | A1 | 8/2002 | Chin et al. |
| 2002/0152112 | A1 | 10/2002 | Myers et al. |
| 2002/0152174 | A1 | 10/2002 | Woods et al. |
| 2002/0184119 | A1 | 12/2002 | Gagne et al. |
| 2003/0004735 | A1 | 1/2003 | Dutta et al. |
| 2003/0009361 | A1 | 1/2003 | Hancock et al. |
| 2003/0023522 | A1 | 1/2003 | Dutta et al. |
| 2003/0036982 | A1 | 2/2003 | Tang et al. |
| 2003/0037009 | A1 | 2/2003 | Tobin et al. |
| 2003/0041033 | A1 | 2/2003 | Kaplan |
| 2003/0046220 | A1 | 3/2003 | Kamiya |
| 2003/0061058 | A1 | 3/2003 | Dutta et al. |
| 2003/0069831 | A1 | 4/2003 | Le et al. |
| 2003/0078885 | A1 | 4/2003 | Felton et al. |
| 2003/0101069 | A1 | 5/2003 | Sando |
| 2003/0115072 | A1 | 6/2003 | Manucha et al. |
| 2003/0144863 | A1 | 7/2003 | Liu |
| 2003/0154143 | A1 | 8/2003 | Chen |
| 2003/0167240 | A1 | 9/2003 | Napier et al. |
| 2003/0171948 | A1 | 9/2003 | Thomas et al. |
| 2003/0191652 | A1 | 10/2003 | Li et al. |
| 2003/0195815 | A1 | 10/2003 | Li et al. |
| 2004/0019569 | A1 | 1/2004 | Lee et al. |
| 2004/0088245 | A1 | 5/2004 | Narayan et al. |
| 2004/0098356 | A1 | 5/2004 | Shabtai |

FOREIGN PATENT DOCUMENTS

| | | |
|---|---|---|
| WO | WO-99/34272 | 7/1999 |
| WO | WO-00/46726 | 8/2000 |
| WO | WO-00/52555 | 9/2000 |
| WO | WO-01/18712 | 3/2001 |
| WO | WO-01/77848 | 10/2001 |

OTHER PUBLICATIONS

Platt, Gordon; "Logistics Firms Offer Trade Finance," Journal of Commerce, Jan. 18, 2000, Proquest #50017017.*

PRN: "UPS Capital Forms Strategic Alliance for Total On-line Billing Payment Solution," PR Newswire, Apr. 25, 2000, Proquest #52872791.*

BWire2: "TradeCard and Tradeeasy Announce Strategic Partnership to Complete the E-Commerce Transaction Loop," Business Wire, Aug. 17, 2000, Proquest #58103165.*

UU: Bacheldor, Beth; "Bills for the 21$^{st}$ Century," Informationweek, May 1, 2000, n784p22, Proquest #87506874.*

PRN: "CyberSource, UPS, and i-Escrow form alliances with Moai," PR Newswire, Nov. 19, 1999, Dialog file 20 #08309047, 2pgs.*

Joshi et al; "Bidder's remorse online auctions now No. 1 source of Internet fraud," Newsday, Aug. 30, 2000, Dialog file 638 #10743020, 6pgs.*

Rogers: "Firm Hopes to be refuge for online buyers," King, Suzzanne, Kansas City Business Journal, Jan. 28, 2000, v18i21p. 1, Proquest #48864177, 3pgs.*

Rodgers: Wo 01/18712 (Rodgers, William C.) Mar. 15, 2001, 48pgs.*

Thompson, Richard; "FedEx web site can customize customers for many customers," The Commercial Appeal, Aug. 9, 2000, Proquest #57744789, 2pgs.*

Murray, Daniel; "Substitutes for letters of credit sales: A seller's lot is not a happy one," Commercial Law Journal, Fall 1996, v101i3p. 189, Proquest #11313885, 28pgs.*

UU: Venta.com; "United Parcel Service Mexico signs first strategic alliance with online B2B marketplace Venta.com," PR Newswire, May 30, 2000, Proquest #54335955, 3pgs.*

*UPS—Nescrow Materials Submitted in Response to Request Information.*

*Morris Aligns with New E-Commerce Transaction Process*; Morris Communications Corporation; 2 pages; available at http://www.morriscomm.com/press/sept18ntp.html, downloaded Sep. 19, 2000.

Jamie Beckett; *Personal Technology, Rise of the Online Middlemen, Escrow Services in Demand as Net Auction Sites Proliferate*: San Francisco Chronicle, 1999; pp. 1-4.

Cheryl Rosen; *Payment for Perishables: B-To-B System Guarantees It*; Informationweek.com, Mar. 5, 2001; p. 61.

Arnat Leemakdej; *Online Payment Options, Escrow system may offer best safeguards for international traders*; Bangkok Post, Feb. 2, 2001; pp. 1-3.

*i-Escrow.com Adopts New Name Tradenable, Plans Rollout of Transaction Settlement Services for Businesses*; Dow Jones Interactive, PR Newswire, Jan. 17, 2001, pp. 1-2.

*FrugalEscrow PLC enters The US Escrow Market Ahead Of Schedule*; Dow Jones Interactive, PR Newswire, Jan. 3, 2001, pp. 1-2.

*Pitney Bowes Provides Online Escrow Services for Captial Stream*; Dow Jones Interactive, PR Newswire, Jan. 16, 2001, pp. 1-2.

*Pitney Bowes To Offer Escrow Svcs For CapitalStream Users*; Dow Jones Interactive, PR Newswire, Jan. 16, 2001, pp. 1-2.

*Escrow Guardian—The safest and most inexpensive way to trade through online auctions*; www.escrowguardian.com; downloaded Feb. 28, 2001; pp. 1-2.

*Escrow Guardian—The safest and most inexpensive way to trade through online auctions*; Frequently Asked Questions; www.escrowguardian.com; downloaded Feb. 28, 2001; pp. 1-4.

*Escrow Guardian—The safest and most inexpensive way to trade through online auctions*; Terms of Service and Credit Card User Agreement; www.escrowguardian.com; downloaded Feb. 28, 2001; pp. 1-3.

*Show me the money, How PayPal works*; ZDNet: Business & Tech E-Commerce: How PayPal works; 3 pages, available at http://www.zdnet.com/ecommerce/stories/main/0,10475,2687755-5,00/html, downloaded on Mar. 19, 2001.

Safe2Trade.com, *How it Works*; 2 pages, available at http://www.safe2trade.com/steps.htm; downloaded on Feb. 27, 2001.

i-Escrow.com *adopts new name Tradenable, plans rollout of transaction settlement services for businesses*; Tradenable Fearless Commerce; 2 pages, available at http://www.tradeenable.com/prerelase/011701.html, downloaded on Feb. 5, 2001.

*Personal Webpages*; Tradenable Fearless Commerce; 2 pages, available at http://www.tradeenable.com/webpages.html, downloaded on Feb. 5, 2001.

*Classified Ads Sites (non-automotive)*; Tradenable Fearless Commerce; 1 page, available at http://www.tradeenable.com/classified.html, downloaded on Feb. 5, 2001.

*Retail Sites*; Tradenable Fearless Commerce; 1 page, available at http://www.tradeenable.com/retail.html, downloaded on Feb. 5, 2001.

*Services*; Tradenable Fearless Commerce; 2 pages, available at http://www.tradeenable.com/services_index.html, downloaded on Feb. 5, 2001.

*Partnerships*; Tradenable Fearless Commerce; 2 pages, available at http://www.tradeenable.com/current.html, downloaded on Feb. 5, 2001.

*About Us*; Tradenable Fearless Commerce; 2 pages, available at http://www.tradeenable.com/aboutus_index.html, downloaded on Feb. 5, 2001.

*About Us, What's New, We've Changed Our Name*; Tradenable Fearless Commerce; 2 pages, available at http://www.tradeenable.com/whats.html, downloaded on Feb. 5, 2001.

*E-Commerce Success Story*: i-Escrow.com; E-Commerce Times; Success Stores; 9 pages, available at http://www.ecommercetimes.com/success_stories/success_iescrow.shtml, downloaded on Jan. 8, 2001.

* cited by examiner

INTERNATIONAL CASH-ON-DELIVERY SYSTEM AND METHOD

FIELD OF THE INVENTION

The present invention relates to the field of package shipping systems, and more particularly, to electronic systems for facilitating shipping and purchase transactions across international borders.

BACKGROUND OF THE INVENTION

A typical shipping transaction includes a buyer and a seller of goods. The seller needs to convey goods to the buyer, while the buyer needs to convey payment to the seller. Both the seller and buyer, though, may have a lack of trust problem akin to the "snatch and grab" of face-to-face contractual agreements. Snatch and grab refers to the circumstance where goods and payment are exchanged simultaneously due to a lack of trust between the parties. In particular the seller is skeptical that the buyer will proffer payment after receiving the goods, and the buyer is skeptical that the seller will proffer the goods after receiving payment. In international transactions, this situation is exacerbated by a slow and complicated transaction process. The goods must typically must be shipped long distances and through various import and export procedures. The payment must overcome similar hurdles, such as changes in currency and banking rules and regulations.

Financial instruments have been developed in an attempt to address such lack of trust problems in transactions that require the shipment of a package, or packages. Letters of credit are guaranteed by a bank if the seller meets the specific terms of the letter of credit. In the letter of credit process, the seller and purchaser agree to the terms of the transaction and the purchaser applies for the letter of credit from its bank. The purchaser's bank issues the letter of credit to the seller on the purchaser's behalf. The seller ships the goods and sends the letter of credit to its bank. The seller's bank audits the letter of credit for completeness and accuracy and then forwards the letter of credit to the purchaser's bank. The purchaser's bank compares the documents to the letter of credit to determine if the terms of the letter of credit have been met by the seller. If the documents match, the purchaser's bank pays the seller's bank and provides the purchaser with the verified letter of credit. The purchaser presents the verified letter of credit to the transportation company to take possession of the goods and arrange for final delivery. Under the letter of credit, the purchaser's bank guarantees payment to the seller if the seller meets the specific terms of the letter of credit. Therefore, much of the risk in the transaction is shifted to the purchaser who is contractually obligated to pay if the terms of the letter of credit are met. In addition, the purchaser must receive a credit approval prior to shipment, which delays the shipment. If the purchaser fails to obtain credit approval, the transaction may not be completed.

Another conventional method is a documentary collection process wherein the seller exports the goods to the purchaser, but instructs the seller's bank to collect the payment from the purchaser in return for transfer of title, shipping and other documentation. In the documentary collection process, the seller and purchaser agree to terms. The seller ships the goods and sends the documentary collection to the seller's bank. The seller's bank forwards the documents to the purchaser's bank. The purchaser's bank notifies the purchaser that payment must be made to receive the documents. The purchaser pays the purchaser's bank and the purchaser's bank provides the purchaser with the documents. The purchaser takes the documents to the transportation company to take possession of the goods and arranges for local delivery. The purchaser's bank pays the seller through the seller's bank. Unlike the letter of credit, the purchaser has no "up front" obligation to pay. However, the purchaser's lack of an obligation places all of the risk of the transaction on the seller. In addition, the documentary collection process is slow and complicated, due to the number of documents that must be manually transferred and audited.

PCT Publication WO 00/52555 to Stroh discloses a trade financing system that employs modified bills of exchange for international trade in goods and services. The buyer executes a bill of exchange, which is a payment draft, and submits the bill of exchange to the seller along with an order for a traded product. The bill of exchange is made payable to the seller, or the seller's agent. The seller obtains a verification of the creditworthiness of the draft, and upon receiving verification, the seller ships the traded product. The bill of exchange is "event-triggered" and becomes negotiable upon release of the traded product to the control of the buyer. Notice of the triggering event includes a receipt of verification of the shipment via the electronic tracking capabilities of the carrier. Once the triggering event is satisfied, the draft becomes negotiable, through conventional banking or other financial channels, for the full value of the traded product, less any fees and discounts charged for processing.

The seller is protected by not having to ship the goods until receipt of, and credit verification of, a payment draft in the form of a bill of exchange executed by the buyer. The bill of exchange protects the purchaser by being latent until a triggering event occurs, such as release of the traded product by the transportation company into the control of the buyer. However, execution of payment documents by the buyer, and the full demonstration of readiness to pay to the seller before the seller ships the goods, delays the shipping process. In addition, the draft is a full contractual agreement that must be signed by both parties before the transaction is complete, and must later be negotiated to obtain a cash payment. Such complexities slow the transaction process, and render use of the bill of exchange undesirable for less sophisticated buyers and sellers.

Therefore, it would be advantageous to have a system for coordinating an international transaction that protects both the seller of goods to be shipped, and the purchaser of the goods. It would be further advantageous to have a system for coordinating an international transaction that does not require the use of complex contractual agreements or documentary collection and auditing processes. It would also be advantageous to have a system for coordinating an international transaction that does not require an up-front credit verification that slows, or may even halt, the transaction.

SUMMARY OF THE INVENTION

The present invention addresses the above needs and achieves other advantages by providing a cash-on-delivery system used to complete a transaction between a seller in one location agreeing to exchange goods for a payment from a purchaser in another location. The delivery system protects the seller of the goods by holding (escrowing) the goods at an intermediate delivery location until the payment for the goods is received from the purchaser. As the payment is not required until shipping has already begun, no up front credit verification or authorization is required of the purchaser.

Optionally, the delivery system can also protect the purchaser of the goods by escrowing the payment until the goods are delivered to the purchaser. Although it can be used for any type of shipment transaction, the delivery system is especially beneficial for electronically coordinating shipping of, payment for and delivery of the goods across international boundaries.

In one embodiment, the present invention includes a delivery system for completing a transaction between a seller having a funds account and a purchaser having a funds account, wherein the seller has agreed to exchange a package, or packages, of goods for a payment from the purchaser. A delivery service system capable of delivering the package from a first location to an intermediate location is included in the delivery system. The delivery service system is responsive to a hold command to hold the package at the intermediate location, and is responsive to a release command to release the package from the intermediate location. A payment system included in the delivery system is configured to receive the payment from the purchaser's funds account and to transmit payment verification information in response to receipt of the payment. An information system configured to receive instructions from one of the seller, purchaser and delivery service system is also included in the delivery system. The information system is further configured to transmit the hold command to the delivery service system in response to the instructions. The information system is further configured to transmit the release command to the delivery system in response to receiving the payment verification information, thereby releasing the package for pick up by the purchaser, or delivery to the purchaser.

In another aspect, the delivery service system is further capable of delivering the package to a final location, such as a purchaser location, after releasing the package. In the case of delivery to the purchaser location, the delivery service system is capable of transmitting to the information system information verifying delivery to the purchaser location. The payment system may be further configured to hold the payment on receipt and to distribute the payment to the seller's account in response to a distribution command. In this aspect, the information system is configured to transmit the distribution command to the payment system in response to receipt of the delivery verification information.

The present invention is particularly useful for a cross-border transaction wherein the first location is in a first country and the intermediate location is in a second country that is also occupied by the purchaser. An export brokerage of the delivery service system is located in the first country and is capable of clearing export of the package out of the first country. An import brokerage of the delivery service system is located in the second country and is capable of clearing import of the package into the second country. Further, the import brokerage has facilities to hold the package, such as those used to await import authorization, at the intermediate location in response to the hold command. Holding the package in the purchaser's country allows delivery of the package to the purchaser in a single final step. Alternatively, the intermediate location may be in the first country, or in a country en route to the purchaser's country, where the shipper has facilities particularly suited to holding the package.

Initiation of package shipping and the escrow functions of the delivery system may be performed separately by a party to the transaction, such as the seller. Alternatively, the delivery system may further comprise a shipment order system that is configured to record shipment order information submitted by the seller when shipping the package and to transmit the shipment order information to the information system. In turn, the delivery service system is configured to receive the shipment order information from the information system, eliminating the step of re-entering the shipment order information. In the case of an international transaction, the shipment order information includes export and import information. The import and export information may include at least one of a value-of-goods information, a transaction reference number and a currency of payment. The shipment order system transmits the export and import information directly to the export and import brokerages after sending shipment notification to the information system. Export of the package is cleared out of the first country having the first location by the export brokerage of the delivery service system using the export information while import into the second country having the intermediate location is cleared at the import brokerage using the import information. In the alternative, export and import information could be sent first to the information system, and then on to the brokerages.

In yet another aspect, the information system is configured to transmit notification information to the purchaser in response to receipt of the shipment order information. A description of the goods and payment instructions are included in the notification information. An account identification number and an amount of the payment are included in the payment instructions. Optionally, the information system further includes a secure Internet site having payment instructions, wherein the notification information includes a link to the payment instructions on the secure Internet site. The shipment order system may transmit the shipment order information directly to the purchaser.

Preferably, the systems of the delivery system described above for both embodiments are capable of electronically transmitting and receiving their respective information and commands.

In another embodiment, the present invention includes an electronic information system for coordinating delivery of a package by a seller using a delivery system and payment for the package by a purchaser using an account system. The information system includes a request system capable of receiving a coordination request to coordinate delivery of, and payment for, the package from one of the seller, the purchaser and the delivery system. Further, the request system is capable of transmitting a verification of the coordination request. Also included in the information system is a hold system capable of receiving the verification of the coordination request. The hold system is further capable of transmitting a hold request to the delivery system in response to receipt of the coordination request verification. The hold request includes a request for the delivery system to hold the package at a location. A release system of the information system is capable of receiving payment verification transmitted by the account system. The payment verification verifies payment for the package by the purchaser via the account system. Further, the release system is capable of transmitting a release request to the delivery system in response to receipt of the payment verification. The release request authorizes the delivery system to release the package for pick up by, or final delivery to, the purchaser.

The present invention has several advantages. An up-front verification of the creditworthiness of the purchaser is not required, allowing shipping to be commenced immediately after agreement by the seller and purchaser to conduct the transaction. The lack of a purchaser credit authorization requirement also expands the pool of potential purchasers to include those without readily available credit. The ability of the present invention to escrow both the funds, and the goods, protects both the seller and the purchaser in the transaction. The seller is assured that the package will not be delivered to the purchaser until payment is received by the delivery system, while the purchaser is assured that payment is not being released until the package has been received. Further, the delivery system simplifies international transactions by coordinating delivery, payment and information flows that normally must be coordinated by the seller or purchaser. Therefore, only a single point of contact is used by the seller and purchaser with respect to payment for, and delivery of, the package. In addition, the option of integration of the various systems eliminates duplicative, manual entries of shipping, and other information, necessary to deliver the package across international borders. Elimination of such duplicative entries reduces the risk of transcription errors. Generally, the automation of manual document transfers provided by delivery system speeds the overall transaction, making payment for the package available in fewer days than needed for a letter of credit.

BRIEF DESCRIPTION OF THE DRAWINGS

Figure 1:
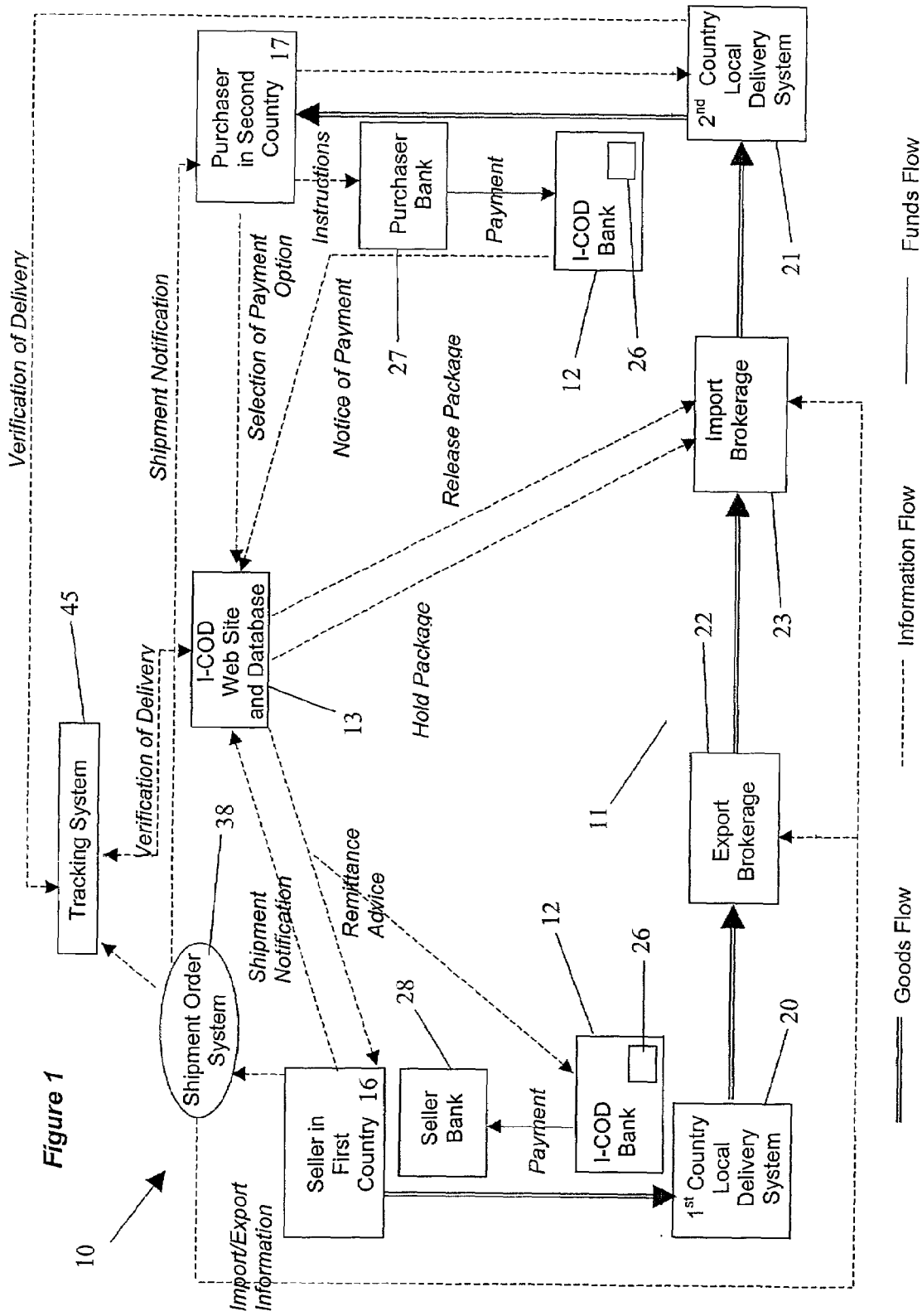
Figure 2:
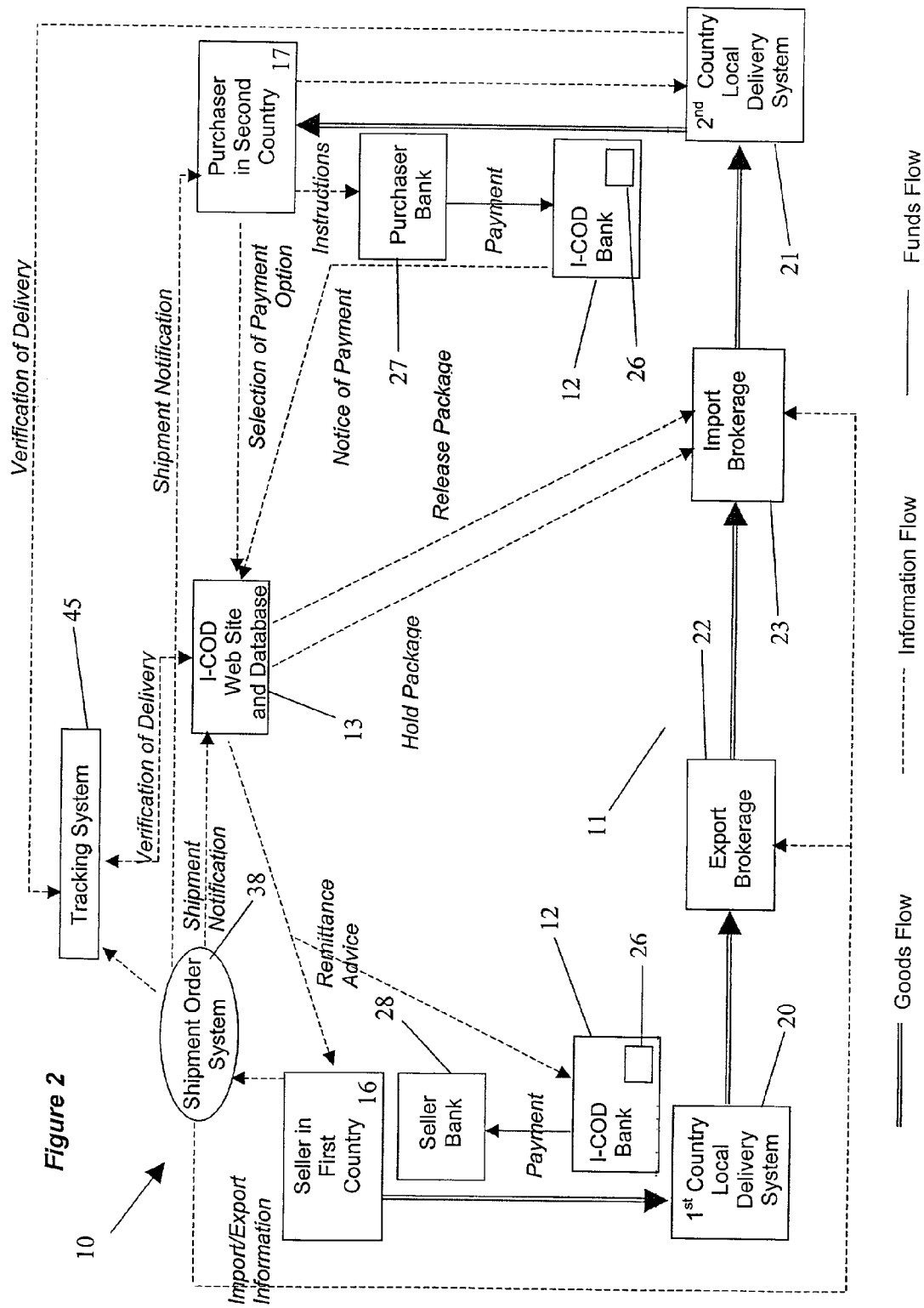
Figure 3:
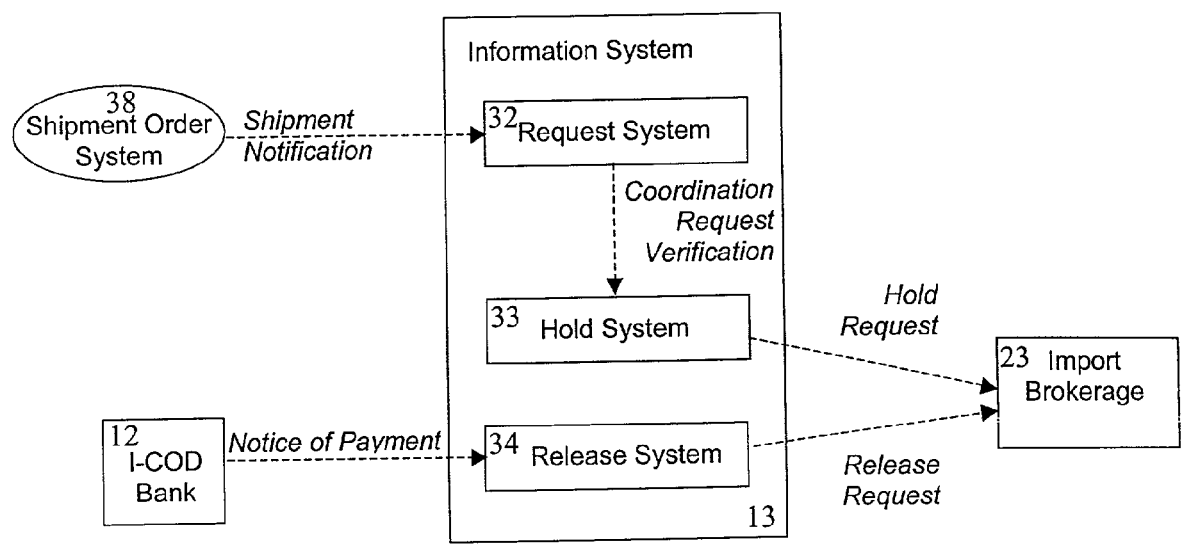
Figure 4:
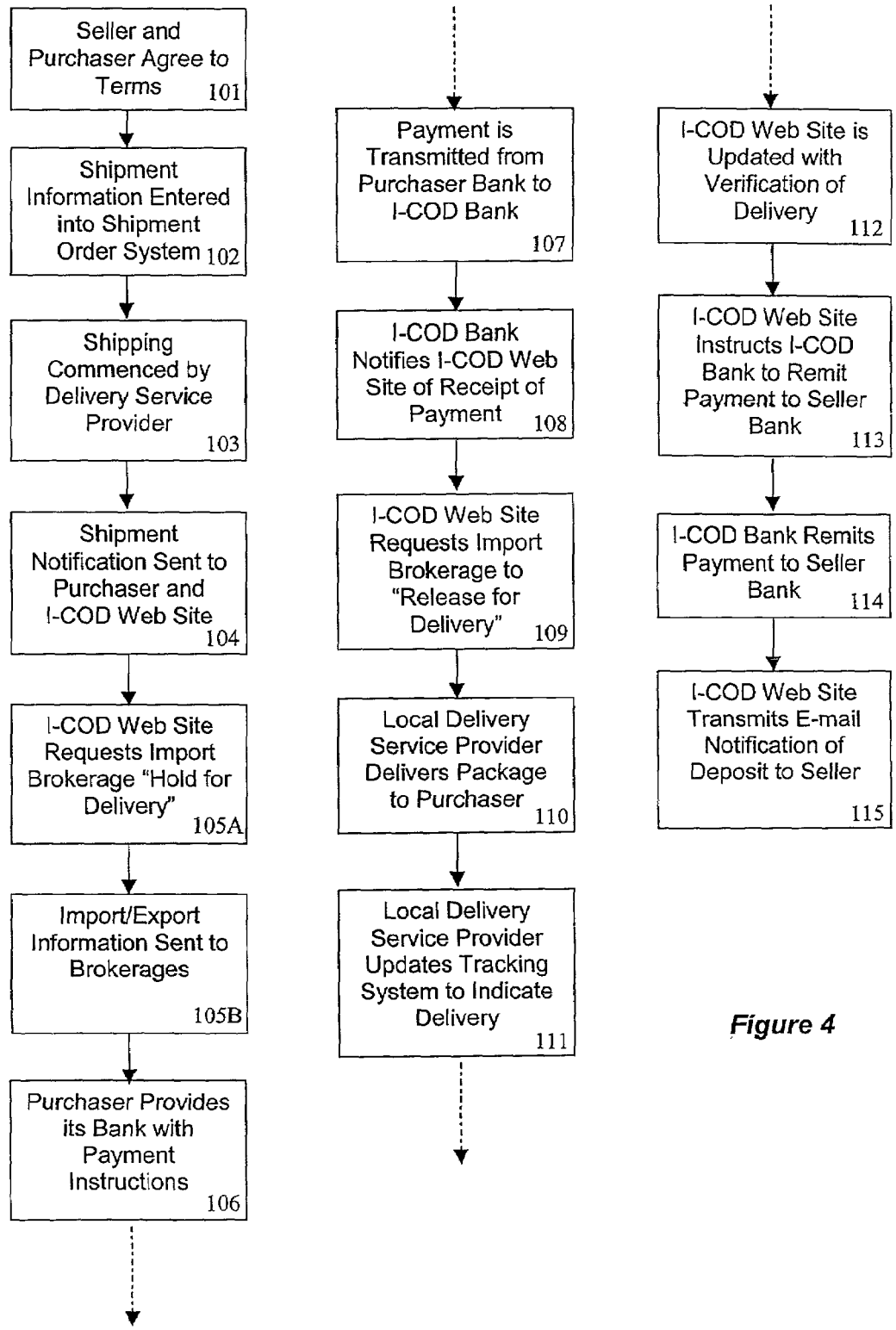
Figure 5:
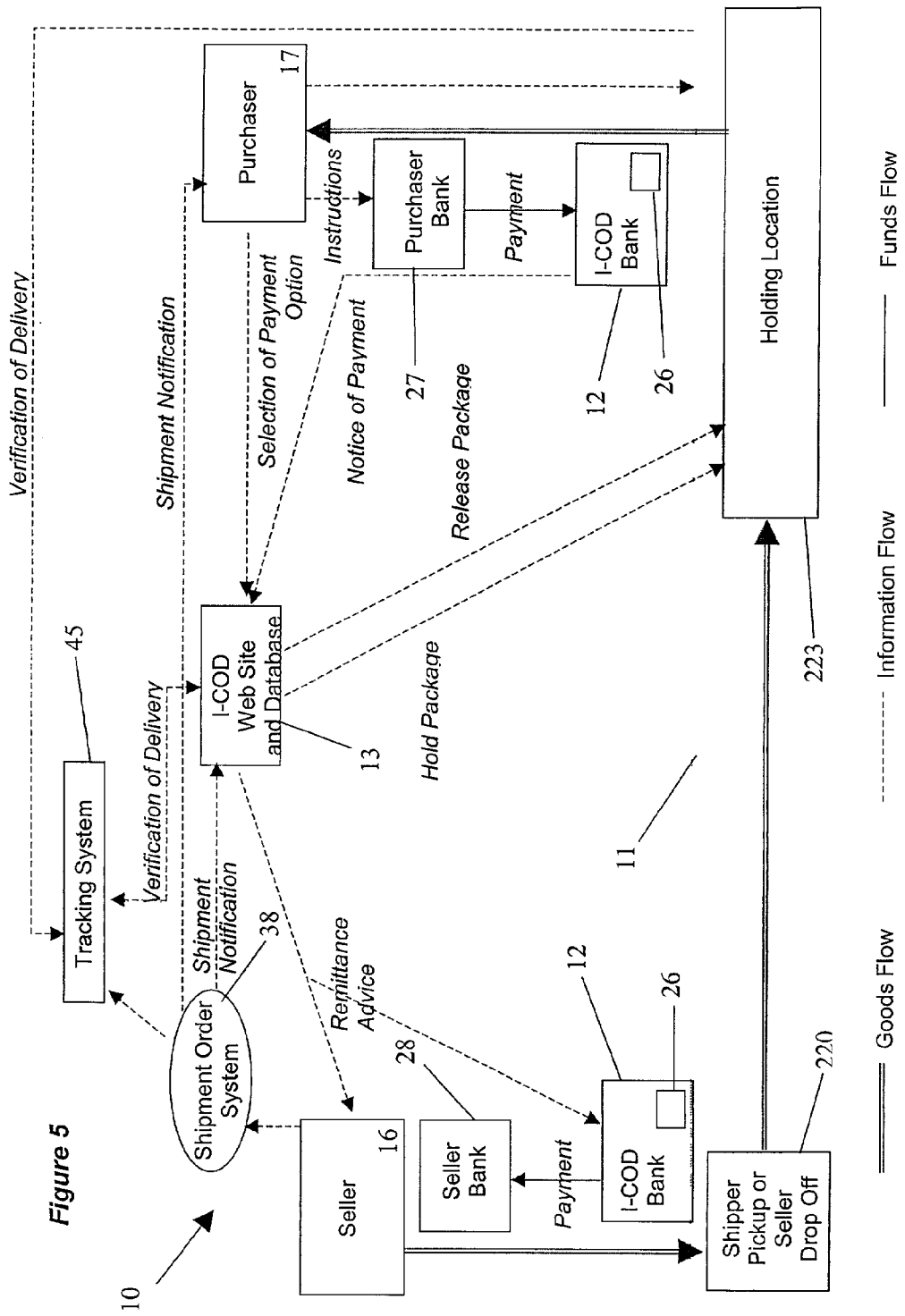

Having thus described the invention in general terms, reference will now be made to the accompanying drawings, which are not necessarily drawn to scale, and wherein:

FIG. 1 is a schematic diagram of a cash-on-delivery system of one embodiment of the present invention;

FIG. 2 is a schematic diagram of the cash-on-delivery system of FIG. 1 showing direct communication of shipment order information between a shipment order web site and a cash-on-delivery web site;

FIG. 3 is a schematic diagram of an information system of another embodiment of the present invention for coordinating delivery of, and payment for, a shipped package;

FIG. 4 is a flow diagram of a cash-on-delivery shipping method employing the cash-on-delivery system of FIGS. 1 and 2; and FIG. 5 is a schematic diagram of another embodiment of the cash-on-delivery system used for transactions occurring in a common country.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A cash-on-delivery system of the present invention completes a transaction between a seller at a first location and a purchaser at a second location, wherein the seller has agreed to exchange packaged goods for a payment from the purchaser. Generally, the delivery system includes a delivery service system, a payment system and an information system. The delivery service system physically handles delivery of the package and holding of the package in escrow until payment by the purchaser. The payment system handles the flow of funds including receiving payment from the purchaser, holding the payment in escrow and distribution of the payment to the seller upon delivery of the package. The information system electronically coordinates escrow aspects of both the delivery service system, and the payment system, so as to minimize the risk of the transaction to both the seller and the purchaser. It should also be noted that the present invention is not limited to the shipment of a single package, and for instance could also include a shipment of several packages from the same transaction of goods, or several packages from several transactions of goods.

In a preferred embodiment, the present invention is an international cash-on-delivery (I-COD) system 10 including a delivery service system 11, a payment system 12 and an information system 13, as shown in FIGS. 1 and 2. The I-COD system is especially useful for cross-border transactions, i.e., for transactions between a seller 16 in a first country and a purchaser 17 in a second, different country. The delivery service system 11 preferably includes an export brokerage 22 and an import brokerage 23. The export brokerage 22 is located in the seller's (first) country and uses export information submitted by the shipment order system 38 to clear the package for export from the seller's country. The import brokerage 23 is located in the purchaser's (second) country and also uses import information submitted by the shipment order system 38 to clear the package for import into the purchaser's country. The delivery service system 11 may be further capable of physically delivering the package from the export brokerage 22, across one or more international borders, to the import brokerage 23. Alternatively, the delivery service system may employ another party, such as an overseas maritime or air freight carrier, to transport the package between the brokerages.

The import and export information preferably includes such information as, a date of shipment, a shipping service account number for shipping service charges associated with the transaction, names of the parties involved in the transaction, origin and delivery addresses, contact names, phone numbers and email addresses, and a cost breakdown of the shipping costs. More preferably, the import and export information includes a shipment tracking number, a transaction reference number (such as a purchase order or invoice number), the value of the goods being shipped, a description of the goods being shipped, the currency of payment and a harmonized tariff code.

Generally, a delivery service system of the present invention is capable of holding the package at an intermediate location while awaiting a release request from the information system. In the I-COD system 10, one of the brokerages 22, 23 of the delivery service system 11 is preferably capable of holding the package at the intermediate location upon receipt of a hold command from the information system 13. More preferably, the import brokerage 23 has a holding location in the second country in which to hold the package in response to the hold command, as shown in FIGS. 1 and 2. Holding the package in the same country in which the purchaser 17 resides allows final delivery of the package to the purchaser in a single step. Alternatively, in some transactions it may be desirable to hold the package in the first country, or intermediate countries en route to the second country. Holding the package in the first country, or an intermediate country, may be desirable when the delivery system has a holding location with facilities particularly suited to holding the package, such as cold storage facilities for packages containing frozen goods, but the facilities are not located in the second country. Use of holding facilities in a country other than the second country may be in response to a customized requested submitted by the purchaser 17, or a customized hold request transmitted by the information system 13. The import brokerage will hold the package for a predetermined maximum number of days, or until receiving a release command from the information system 13. The purchaser 17 may be charged additional extended holding fees associated with holding the package in excess of the maximum number of days. If the purchaser 17 refuses to pay, the additional fees may be charged to the seller 16. In the event of a failure to pay by the purchaser, the seller has the right to have the package returned to its origin, or disposed of by the delivery service system 11.

Optionally, the I-COD system 10 can further include a first country local delivery system 20 and/or a second country local delivery system 21, a shown in FIGS. 1 and 2. The local delivery systems preferably include a tracking system or systems 45 that track the progress of delivery of the package. The first local delivery system 20 is capable of picking up the package at a first location, such as the seller's location, in the first country and delivering the package to the export brokerage 22. The second local delivery system 21 is capable of picking up the package at the import brokerage 22 after the package has been released and delivering the package to a final location, such as a purchaser location. In another alternative, each local delivery system may be a preexisting national delivery service system that is affiliated with one or more of the other systems of the delivery system 10, such as the export brokerage 22.

It should be noted that the delivery service system 11 is not limited to a single corporate entity, and can include a collection of various types of delivery services, such as a public postal delivery system, a private package carrier, or a commercial freight handler. As another example, the export brokerage 22 and import brokerage 23 may be separate entities, such as independent import and export brokerages that have agreed to communicate with the information system 13 to handle the escrow and clearing of the shipment. Such deliveries can be made electronically over a computer network, or physically via such equipment as maritime vessels, rail, trucking or air freight. For instance and as discussed above, the export brokerage 22 of the I-COD system 10 can release the package to the freight handling service of another company, such as a maritime or air freight handler, for delivery to the import brokerage 23.

The payment system 12 is capable of receiving funds for payment from the purchaser 17, of holding the funds received in escrow and of distributing the funds to the seller 16. The payment system 12 is also capable of notifying the information system 13 to verify receipt of the payment from the purchaser 17. Preferably, the payment system 12 is an I-COD bank and includes an account 26 for holding the payment, as shown by FIGS. 1 and 2. In addition, the account preferably has an account number allowing payment for the package, and other payments, to be electronically received through existing banking and financial networks from the purchaser 17. The purchaser and seller have a purchaser's funds account 27, and a seller's finds account 28, respectively. The purchaser's funds account 27 is capable of transmitting the payment for the package. Alternatively, the purchaser's funds account can be electronically accessed by the payment system 12 to obtain the payment, such as by having routing and account numbers compliant with existing banking and financial systems.

Optionally, the payment system 12 is further capable of distributing the payment to the seller's funds account 28 in response to a distribution command from the information system 13. In this option, the seller's funds account 28 is capable of receiving the payment for the package from the payment system 12. Preferably, the seller's funds account 28 has an account number, including a routing number, that allows the account to receive the payment electronically from the payment system. The term "account," as used herein, should be construed broadly to include all types of financial instruments and entities for holding, creating or distributing funds, such as savings accounts, checking accounts, wire accounts, credit accounts, banks and brokerages.

In general, the information system 13 is a system, or a collection of systems, capable of transmitting and receiving information and commands from the other systems of the delivery system 10. Preferably, the information system 13 includes an electronic system such as an Internet site, or web site, that is easily accessible to the parties of the transaction and the various systems. Preferably, the information system also includes an e-mail system, a file transfer protocol system, a direct electronic network connection, or other electronic communication system, that allows it to communicate commands, instructions and other information efficiently with the other systems and the parties to the transaction.

For instance, the information system may be capable of electronically receiving instructions from one of the seller, the purchaser or the delivery service system and may be further capable of electronically delivering notification information to the purchaser. The instructions contain shipping information on a shipment already shipped by the first local delivery system 20 and a request for coordination by the information system 13. The electronic notification information alerts the purchaser 17 of the shipment using such information as a description of the goods and a shipping date of the package. In addition, the electronic notification information may contain payment instructions, including the account number allowing electronic transfer of the payment from the purchaser's finds account 27 to the account 26. Such electronic notification can include, but is not limited to, an e-mail that contains an embedded hyperlink that directs an Internet browser on the purchaser's computer to payment instructions on a secure web page on the Internet site of the information system 13.

The information system is also capable of receiving the payment verification information from the payment system 12 and of transmitting the release command to the delivery service system 11 once the payment verification has been received. The release command requests that the delivery service system release the package for final delivery. Optionally, the information system 13 is further capable of receiving the delivery verification information from the tracking system 45, indicating delivery of the package to the final location, such as the purchaser 17. The information system 13 is capable of transmitting the distribution command to the payment system 12 in response to receipt of the delivery verification information. The distribution command requests payment to the seller 16, such as by deposit of the payment into the seller's funds account 28, as discussed above.

In an alternative to the transmission of a hold command directly from the information system, a package tracking number, or other indicia on the package labeling, can contain instructions to the delivery service system 11 to hold the package pending a release command or can prompt the service person to take an alternative action to receive the hold instructions. Such an alternative action can include, but is not limited to, logging onto the Internet site of the information system 13 wherein the Internet site include a web page requesting that the package be held pending receipt of payment. The web page can also include shipping information, such as export and import information allowing export and import clearance of the package.

Preferably, the international delivery system 10 of the present invention further includes a shipment order system 38 that receives shipment orders, records shipping information related to those orders and initiates physical delivery by the delivery service system 11. The shipment order system may include an Internet site, or web site 38, that is easily accessible to the seller or purchaser for electronic placement of the shipment order. Coordination of the shipment as a cash-on-delivery transaction is begun by submission of shipment notification to the information system 13. In a first alternative shown in FIG. 1, the seller 16 ships the package and transmits shipment notification by reentering shipment information into the information system web site 13. In a second alternative shown in FIG. 2, the shipment order system 38 sends the shipment notification directly to the information system 13.

For instance, the shipment order system 38 in the second alternative may include an option for designating, or requesting, that the delivery be handled by the I-COD system 10. Upon selection of the cash-on-delivery option and submission of the shipment order, the shipment order system 38 fulfills the shipment order and then electronically forwards the shipping information and the handling request to the information system 13.

In another example of the second alternative, the shipment order system 38 sets a brokerage hold indicator, or flag, when the seller selects the option of shipping I-COD. The shipment order system 38 submits the flag with the shipment information to the information system 13. The flag allows the I-COD shipments to be identified by the delivery service system 11 as unique, and separate from other shipments. Submission of the flag is preferably accompanied by an electronic notification sent to the purchaser 17 by the shipment order system 38 or the information system 13. The electronic notification contains information such as identification of the shipment as I-COD, a brief description of the goods, the value of the goods in the package, a message stating that payment must be made before final delivery is made, and may contain a hyperlink to the I-COD web site 13 for additional information and a password to log on to the web site.

In another embodiment, the present invention includes an information system that comprises a request system 32, a hold system 33, and a release system 34, as shown in FIG. 3. The request system 32 is capable of receiving instructions from the seller 16, purchaser 17 or the delivery service system 11. The instructions request coordination of the payment for, and delivery of, the package by the information system 13. The request system 32 is further capable of sending a coordination request verification to the hold system. The hold system 33 is capable of transmitting the hold request to the delivery service system 11 in response to receipt of the verification from the request system 32. The release system 34 is capable of receiving the payment verification transmitted by the payment system 12 and, in response to receipt of the payment verification, transmitting the release command to the delivery service system 11.

In cases where the elements of the system provide notification, preferably electronic notification, examples of notification technology include, e-mail, web page posting and others.

The international cash-on-delivery system 10 of the present invention is used to complete an international transaction between the seller 16 and the purchaser 17, as shown in FIG. 4. Before using the delivery system 10, the seller 16 and purchaser 17 agree to the terms of the transaction 101. For instance, the purchaser may log on to a retail or wholesale web site of the seller, select merchandise from the web site for purchase, agree to a payment amount and agree to a shipping method, i.e., use of the I-COD system 10. The seller 16 prepares the merchandise as a package (or packages) and enters shipment information 102 into a shipment order web site 38 of the delivery service system 11. The local delivery system 20 in the first country begins delivery of the package 103.

Upon entry of shipment information by the seller 16, shipment notification is sent 104 by the shipment order system 38 to the I-COD web site (information system) 13. In response to receipt of the shipment notification, the I-COD web site 13 transmits 105A a request to the import brokerage 23 to hold the package for delivery. Shipment notification is also sent 104 by the shipment order web site 38 or the information system 13 to the purchaser 17. The shipment information, such as the export and import information, is sent 105B to the export brokerage 22 and the import brokerage 23 by the shipment order system 38. Preferably, the shipment information is sent to the brokerages after it has been transmitted to the information system 13, but may also be sent contemporaneous with sending 104 the shipment notification to the I-COD web site 13, or with transmission 105A of the hold request.

The shipment notification sent to the purchaser includes a description of the goods and payment instructions. Preferably, the payment instructions include a number of the account 26 at the I-COD bank, or payment system 12. The purchaser 17 then provides 106 the payment instructions to the purchaser's bank, or funds account 27. The payment instructions authorize payment and allow the purchaser's bank 27 to electronically transmit 107 and deposit the payment in the I-COD bank account 26. The I-COD bank 12 notifies 108 the I-COD web site 13 of receipt of the payment.

Upon receipt of the payment notification, the I-COD web site 13 requests 109 the import brokerage 23 to release the package for delivery. The second country local delivery service 21 picks up the package and delivers 110 the package to the purchaser 17. The second local delivery service 21 updates 111 its tracking system 45 to indicate delivery of the package. The I-COD web site 13 is electronically updated 112 with the delivery verification information. The I-COD web site 13 then instructs 113 the I-COD bank 12 to remit the payment to the seller's bank 28. The I-COD bank 12 withdraws the payment from the account 26 and remits 114 the payment, preferably via direct deposit, to the seller's bank 28. Also, the I-COD web site 13 transmits 115 e-mail notification of the deposit to the seller 16. I-COD service charges are deducted from the amount paid by the purchaser before deposit of the funds in the seller's account 28.

In the event that the payment system 12 has not received payment information from the purchaser 17 within a predetermined amount of time, the information system 13 will send a reminder to the purchaser and seller that the original notification has not yet been acknowledged by the purchaser. If the purchaser pays an amount which differs from the required payment amount, the purchaser will be notified by the information system 13 of the amount received and the outstanding amount. If the purchaser 17 pays the outstanding amount, the information system will issue the release request to the import brokerage 23. If the purchaser does not pay the outstanding amount, the information system 13 will notify the seller 16. The seller has the option of waiting for the outstanding amount, rejecting payment or accepting the amount received. If the amount received is accepted, the release command is transmitted by the information system 13.

If the purchaser 17 refuses to pay or refuses the package, the seller 16 pays for return of the package, or the package is otherwise disposed of as requested by the seller. In the event that the purchaser pays less than the required payment amount, the I-COD bank 12 will return the finds to the purchaser minus any associated handling fees. Also, the delivery system 10 will return the package to the seller, or dispose of the package as per instructions from the seller.

Although the preferred embodiments of FIGS. 1 and 2 involve international transactions, it should be understood that the present invention can be applied to transactions where the seller 16 and purchaser 17 are in the same country, as shown in Figure S. In such a case, the seller drops off the package at a drop off location 220 (or the package is picked up from the seller 16 by the shipper) and the package is transported by the delivery service system 11 to a holding location 223 for the goods. The holding location can be, for example, a hub or service center of the carrier which provides the delivery service. In both domestic and international transactions, a single shipper may transport the goods before and after they are held, and may operate the information system 13 and/or may be affiliated with the I-COD bank 12.

The present invention has several advantages. An up-front verification of the creditworthiness of the purchaser is not required, allowing shipping to be commenced immediately after agreement by the seller and purchaser to conduct the transaction. The lack of a purchaser credit authorization requirement also expands the pool of potential purchasers to include those without readily available credit. The ability of the present invention to escrow both the funds, and the package, protects both the seller 16 and the purchaser 17 in the transaction. The seller is assured that the package will not be delivered to the purchaser until payment is received by the delivery system 10. In addition, the purchaser is assured that payment is not being released until the package has been received by the purchaser. The delivery system simplifies international transactions by coordinating delivery, payment and information flows that normally must be coordinated by the seller or purchaser. Therefore, only a single point of contact is used by the seller and purchaser with respect to payment for, and delivery of, the package. In addition, integration of the various systems eliminates duplicative, manual entries of shipping, and other information, necessary to deliver the package across international borders. Elimination of such duplicative entries reduces the risk of transcription errors. The delivery system does not require credit authorization of the purchaser which expands the pool of potential purchasers and allows immediate shipment of the package without delay. Generally, the I-COD system 10 makes the payment available in fewer days than needed for a letter of credit.

Those skilled in the art will recognize that several aspects of the present invention, such as the information system 13, are preferably implemented in a distributed or networked computing environment, such as the Internet. In a distributed or networked computing environment like the Internet, program modules may be physically located in different local and remote memory storage devices. Execution of the program modules may occur locally in a stand-alone manner, or remotely in a client/server manner. By way of illustration, and not limitation, distributed computing environments include local area networks (LAN) of an office, enterprise-wide area networks (WAN), and the global Internet (wired or wireless connections). Accordingly, it will be understood that the term "system" as used herein includes all types of computer systems, network systems, operating systems and application programs, including, but not limited to, all types of computers and the program modules designed to be implemented by computers.

It will be understood that the electronic programs, processes, routines and methods described herein are not related or limited to any particular computer or apparatus, nor are they related to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Many modifications and other embodiments of the invention will come to mind to one skilled in the art to which this invention pertains having the benefit of the teachings presented in the foregoing descriptions and the associated drawings. For instance, the I-COD system 10 could be integrated into an Internet purchasing system to allow the purchase of goods in different countries with subsequent import, export and payment for the goods selected using the I-COD system. In addition, the delivery system 10 could be used for national, as well as international, COD transactions. In yet another option, the shipment order system 38 or the information system 13 is capable of calculating the "landed costs," that is, the total cost of the transaction (including the various fees associated with import and export of the shipment). Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A delivery system for facilitating a transaction between a seller having a funds account and a purchaser having a funds account, wherein the seller has agreed to exchange one, or more, packages of goods for a payment from the purchaser, the delivery system comprising:

a delivery service system delivers the package from a first location to an intermediate location and receives a hold command associated with the package and responsive to the hold command holding the package at the intermediate location pending receipt of a release command, and responsive to the release command releasing the package for delivery to the purchaser, wherein removal of the hold command is indicative of receipt of the payment associated with the package into escrow;

a payment system receives the payment associated with the package from the purchaser's funds account, holds the payment in escrow on receipt, transmits payment verification information in response to receiving the payment in escrow and to distribute the payment from escrow to the seller's account in response to a distribution command, wherein receipt of the distribution command is indicative of delivery of the package to the purchaser; and an information system receives a request from one of the seller, purchaser or delivery service system and automatically transmits the hold command to the delivery service system responsive to the request and receives the payment verification information from the payment system, the information system transmits the release command to the delivery system in response to receiving the payment verification information thereby releasing the package for delivery to the purchaser when payment is made into escrow, the information system further receives a delivery verification information confirming delivery of the package to the purchaser and transmits the distribution command to the payment system in response to receipt of the delivery verification information.

2. A delivery system of claim 1, wherein the delivery service system delivers the package to a purchaser designated location after releasing the package.

3. A delivery system of claim 2, wherein the purchaser designated location is a purchaser location, and wherein the delivery service system transmits the delivery verification information to the information system after delivery to the purchaser location.

4. A delivery system of claim 3, wherein the systems electronically transmit and receive their respective information and commands.

5. A delivery system of claim 1, wherein the first location is in a first country and the intermediate location is in a second country, and the delivery service system further comprises an export brokerage in the first country and an import brokerage in the second country.

6. A delivery system of claim 5, wherein the export brokerage clears export of the package out of the first country and the import brokerage clears import of the package into the second country and holding the package at the intermediate location in response to the hold command.

7. A delivery system of claim 6, wherein the delivery services system further includes a local delivery system that delivers the package from the intermediate location to a purchaser designated location.

8. A delivery system of claim 7, wherein the purchaser designated location is a purchaser location and wherein the delivery service system transmits the delivery verification information after delivery to the purchaser location.

9. A delivery system of claim 8, wherein the systems electronically transmit and receive their respective information and commands.

10. A delivery system of claim 1, further comprising a shipment order system that records shipment order information submitted by the seller and transmits the shipment order information to the delivery service system.

11. A delivery system of claim 10, wherein the shipment order information includes export and import information and wherein the delivery service system receives the shipment order information from the shipment order system and clears export of the package out of a first country having the first location using the shipment information and import of the package into a second country having the intermediate location using the shipment information.

12. A delivery system of claim 11, wherein the import and the export information includes at least one of a value-of-goods information, a transaction reference number or a currency of payment.

13. A delivery system of claim 10, wherein the shipment order system transmits notification information to the purchaser in response to receiving the shipment order information.

14. A delivery system of claim 13, wherein the notification information includes a description of the packaged goods and payment instructions.

15. A delivery system of claim 14, wherein the payment system includes an account and wherein the payment instructions include an account identification number and an amount of the payment.

16. A delivery system of claim 13, wherein the information system includes a secure Internet site having payment instructions and wherein the notification information includes a description of the packaged goods and a link to the payment instructions on the secure Internet site.

17. A delivery system of claim 16, wherein the payment system includes an account and wherein the payment instructions include an account identification number and an amount of the payment.

18. A delivery system of claim 16, wherein the systems electronically transmit and receive their respective information and commands.

19. An international cash-on-delivery system for facilitating an international transaction between a seller having a funds account and a purchaser having a funds account, wherein the seller has agreed to exchange one, or more, packages of goods for a payment from the purchaser, and wherein the seller is in a first country having a first department of commerce and the purchaser is in a second country having a second department of commerce, the international cash-on-delivery system comprising:

an export service system receives a package shipment information use the package shipment information to interact with the first department of commerce to clear export of the package out of the first country;

an import service system receives the package shipment information and uses the package shipment information to interact with the second department of commerce to clear import of the package into the second country, the import service system responsive to a hold command associated with the package holds the package pending receipt of a release command and responsive to the release command releases the package; a local delivery system receives the released package from the import service system, delivers the package to the purchaser and transmits a delivery verification information to the information system;

a payment system receives the payment associated with the package from the purchaser's funds account, holds the payment in escrow pending receipt of a distribution command, communicates payment verification information, and further distributes the payment to the seller's funds account in response to receipt of the distribution command; and an electronic information system receives the package shipment information from one of the seller or the purchaser and transmits the shipment information to the export service and the import service, the information system further transmits the hold command to the import service system in response to receiving the package shipment information and prior to release of the package by the import service system, and receives the payment verification information from the payment system indicating payment into escrow, the information system also transmits the release command to the import service in response to receiving the payment verification information, and further transmits the distribution command to the payment system in response to receipt of the delivery verification information thereby controlling movement of the shipping information, the payment verification information and the package so as to complete the international transaction between the purchaser and the seller.

20. An international cash-on-delivery system of claim 19, further comprising a shipment order system that records the shipment order information submitted by the seller and to transmit the shipment order information to the information system.

21. A method of delivery for facilitating a transaction between a seller having a funds account and a purchaser having a funds account, wherein the seller has agreed to exchange one, or more, packages of goods for a payment from the purchaser, the method of delivery comprising:
  receiving the package at a first location using a delivery system;
  receiving shipment order information on the package using an information system;
  responsive to receiving the shipment order information transmitting a hold command to the delivery system using the information system, said hold command associated with the package received at the first location, and instructing the delivery system to hold the package at an intermediate location pending receipt of a release command;
  while the package is under the hold command, at least one of moving the package toward the intermediate location or holding the package at the intermediate location, using the delivery system;
  receiving the payment associated with the package from the purchaser's funds account using a payment system, holding the payment in escrow and transmitting a payment verification to the information system;
  in response to receiving the payment verification, transmitting the release command to the delivery system using the information system;
  while the payment is held in escrow, releasing the hold command in response to the release command;
  while the payment is held in escrow, delivering the package to a purchaser location after releasing the package and receiving a delivery verification at the information system; and
  transmitting a distribution command to the payment system using the information system response to receiving the delivery verification and distributing the payment out of escrow to the seller's funds account using the payment system.

22. A method of delivery of claim 21, further comprising holding the package at the intermediate location using the delivery system in response to the hold command, and
  clearing the package for export from the first location using an export brokerage of the delivery system and clearing the package for import to the intermediate location using an import brokerage of the delivery system before moving the package to the intermediate location.

23. A method of delivery of claim 22, wherein delivery of the package to the purchaser location includes using a local delivery system of the delivery system after releasing the package.

24. A method of delivery of claim 21, further comprising recording shipment order information using a shipment order system and transmitting the shipment order information to the delivery system.

25. A method of delivery of claim 24, further comprising holding the package at the intermediate location using the delivery system in response to the hold command, and wherein the shipment order information includes export and import information and further comprising clearing the package for export from the first location using the export information and clearing the package for import to the intermediate location using the import information before moving the package to the intermediate location.

26. A method of delivery of claim 24, further comprising transmitting notification information to the purchaser using the shipment order system after receiving the shipment order information.

27. A method of delivery of claim 26, wherein the notification information includes a description of the package and a link to payment instructions on a secure Internet site of the information system.

28. A method of claim 21, wherein receiving the package includes receiving delivery information associated with the package and wherein receiving the shipment order information includes receiving a request to hold the package at the intermediate location pending payment into escrow.

29. A method of claim 28, wherein receiving the package is performed prior to receiving the shipment order information.

30. A method of claim 28, wherein the request to hold the package is generated automatically subsequent to receiving the delivery information.

31. A method of claim 28, wherein the request to hold the package is received from the seller.

32. An electronic information system for coordinating delivery of a package, or packages, of goods by a seller using a delivery service system and payment for the package by a purchaser using a payment system, the information system comprising:
  a request system receiving requests from one of the seller, the purchaser or the delivery service system requesting coordination of the delivery of, and payment for, the package, and instructing the delivery service system to deliver the package during a non-guaranteed payment delivery stage, and the request system transmitting a coordination request verification;
  a hold system receiving the verification of the coordination request and automatically transmitting a hold request associated with the package to the delivery service system prior to release of the package from an intermediate location and in response to receipt of the verification of the coordination request, the hold request requesting the delivery service system to hold the package at the intermediate location pending receipt of a release request; and
  a release system receiving a payment verification transmitted by the payment system, the payment verification verifying payment into escrow by the purchaser for the package, and the release system transmitting the release request to the delivery system in response to receipt of the payment verification, the release request requesting the delivery service system to release the package for delivery to the purchaser
  wherein delivery to the purchaser occurs during a guaranteed payment delivery stage, and
  wherein delivery during the non-guaranteed delivery stage is to the intermediate location and delivery during the guaranteed delivery stage is from the intermediate location to the purchaser,
  said release system further transmitting a delivery notification to the payment system, said delivery notification indicating delivery of the package to the purchaser and triggering payment of the seller for the package by the payment system.

33. An electronic information system for coordinating delivery of a package, or packages, of goods by a seller using a delivery service system and payment for the package by a purchaser, the information system comprising:

a request system receiving requests from one of the seller, the purchaser or the delivery service system requesting coordination of the delivery of, and payment for, the package, the request system also transmitting a coordination request verification;

a hold system receiving the verification of the coordination request and automatically transmitting a hold request to the delivery service system in response to receipt of the verification of the coordination request and prior to release of the package from an intermediate location for delivery to the purchaser, the hold request requesting the delivery service system to hold the package at the intermediate location pending notification of a release request;

a payment system receiving payment associated with the package from a funds account of the purchaser, holding the payment in escrow a notification of delivery of the package to the purchaser and transmitting the payment verification in response to receipt of the payment from the funds account of the purchaser, said payment system further distributing funds to a funds account of the seller in response to the notification of delivery of the package to the purchaser;

a release system receiving the payment verification transmitted by the account system and verifying payment by the purchaser for the package, the release system transmitting the release request to the delivery service system in response to receipt of the payment verification, the release request requesting the delivery service system to release the package for delivery to the purchaser; and a delivery notification system notifying the payment system of receipt of the package by the purchaser.

34. A delivery system facilitating a transaction between a seller having a funds account and a purchaser having a funds account, wherein the seller has agreed to exchange one, or more, packages of goods for a payment from the purchaser, the delivery system comprising:

a delivery service system delivering the package from a first location to an intermediate location, and from the intermediate location to a purchaser designated location, a delivery service communication system receiving and transmitting information for said delivery service, said delivery service system responsive to a hold command received via said delivery service communication system to hold the package at the intermediate location pending receipt of a release command and also responsive to the release command received via said delivery service communication system to release the package for delivery of the package to the purchaser designated location, said delivery service communication system further transmitting delivery verification information after delivery of the package by the delivery service to the purchaser designated location;

a payment system receiving and holding in escrow the payment associated with the package from the purchaser's funds account pending receipt of a distribution command and transmitting payment verification information in response to receipt of the payment, said payment system further configured to distribute the payment to the seller's account in response to the distribution command; and a control system electronically connected to the delivery service communication system and the payment system via at least one electronic network, said control system receiving requests from one of the seller, purchaser or delivery service and automatically transmitting the hold command over the network to the delivery service in response to the requests and prior to release of the package from the intermediate location, said control system further receiving the payment verification information over the network from the payment system and transmitting the release command over the network to the delivery service in response to receiving the payment verification information, and said control system further transmitting the distribution command to the payment system in response to receipt of the delivery verification information.

35. A hub and spoke system of computers for controlling delivery of a package via a carrier from a seller to a purchaser, and for controlling payment for the package by the purchaser to the seller from a funds account controlled by a purchaser bank computer, the system comprising:

a facilitator computer having a data memory comprising one or more memory storage areas, said facilitator computer configured as a hub for communication with a plurality of spoke computers, the spoke computers comprising:

an order entry computer, a carrier computer, and an escrow bank computer, the facilitator computer communicating with said spoke computers to:

electronically receive, from the order entry computer, a request to facilitate delivery of, and payment for, the package, and shipment order information associated with the request, and store at least a portion of said request and said shipment order information in the data memory;

electronically receive a notice that transportation of the package from a source location toward an intermediate location is under a package escrow command requesting holding of the package at the intermediate location pending a verification of payment into an escrow account from the purchaser's funds account and update said data memory based on the notice that the package is in transit;

electronically receive, from the escrow bank computer, the payment escrow verification indicating payment into the escrow account from the purchaser's funds account for the package and update said data memory based on the escrow payment verification;

responsive to the payment escrow verification, electronically transmit to the carrier computer a release command terminating the package escrow command and allowing transport of the package beyond the intermediate location to the destination location;

electronically receive, from the carrier computer, a delivery verification and update said data memory based on the delivery verification; and responsive to the delivery verification, electronically transmit a distribution command to the escrow bank computer causing transfer of the payment from the escrow account to a funds account of the seller.

36. A hub and spoke computer system of claim 35, wherein the shipment order information includes the destination location for the package, a tracking number for the package, a transaction amount and seller identifier from the order entry system computer, wherein the verification of payment includes a verification of payment of at least the transaction amount, wherein the delivery verification includes receiving notice of detection of the tracking number from the carrier computer and wherein transfer of the payment to the funds account of the seller includes transfer of at least the transaction amount.

37. A hub and spoke computer system of claim 35, wherein the facilitator computer receives the notice that the package is in transit from the order entry system.

38. A hub and spoke computer system of claim 37, wherein the facilitator computer electronically transmits to the carrier computer the package escrow command subsequent to receipt of the shipment order information, the package escrow command preventing transport of the package beyond the intermediate location which is prior to the destination location.

* * * * *

UNITED STATES PATENT AND TRADEMARK OFFICE
CERTIFICATE OF CORRECTION

PATENT NO. : 7,249,069 B2  Page 1 of 1
APPLICATION NO. : 09/939782
DATED : July 24, 2007
INVENTOR(S) : Alie et al.

It is certified that error appears in the above-identified patent and that said Letters Patent is hereby corrected as shown below:

Title page,
Item (57) ABSTRACT,
Line 2, after "and" insert --a--;
Line 7, after "delivery" insert --service--.

Column 7,
Line 55, "finds" should read --funds--.

Column 8,
Line 35, "finds" should read --funds--.

Column 11,
Line 8, "finds" should read --funds--;
Line 16, "S" should read --5--.

Signed and Sealed this

Twentieth Day of November, 2007

JON W. DUDAS
*Director of the United States Patent and Trademark Office*